(No Model.)

E. H WILSON.
GREEN CORN CUTTER AND SCRAPER.

No. 590,081. Patented Sept. 14, 1897.

Witnesses
James S. Smith
R. Clinton Bolinger

Inventor
Ellen H. Wilson,
By Edwin Guthrie,
Attorney

UNITED STATES PATENT OFFICE.

ELLEN H. WILSON, OF LA CROSSE, WISCONSIN.

GREEN-CORN CUTTER AND SCRAPER.

SPECIFICATION forming part of Letters Patent No. 590,081, dated September 14, 1897.

Application filed June 2, 1897. Serial No. 639,116. (No model.)

*To all whom it may concern:*

Be it known that I, ELLEN H. WILSON, a citizen of the United States, residing at La Crosse, in the county of La Crosse and State of Wisconsin, have invented certain new and useful Improvements in Green-Corn Cutters and Scrapers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to green-corn cutters and scrapers, and has for its object the production of an efficient, cheap, convenient, and durable kitchen or table article specially constructed and adapted for the removal of green corn from the cob.

My invention may be employed for the stated purpose either before or after the corn is cooked, and its culinary field of use may be indefinitely extended. For example, as shown and described herein, my invention is particularly handy in scaling fish, however widely their size may vary.

Each constituent element of my invention is described in detail, and its office, together with the mode of operation of the whole, fully explained hereinafter.

Figure 1:
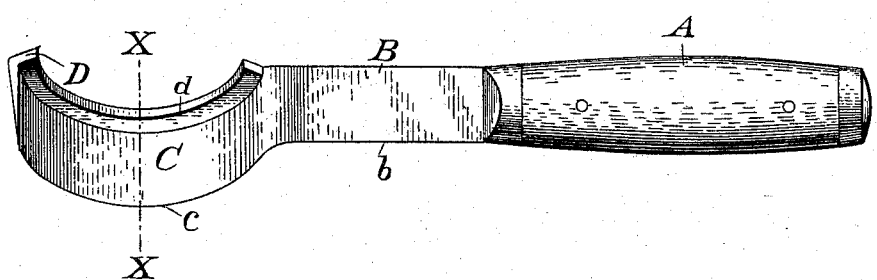
Figure 2:
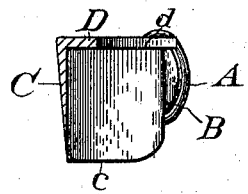

Referring to the accompanying drawings, wherein like letters are used to designate like parts throughout both views, Figure 1 represents a perspective view of my invention, and Fig. 2 a transverse sectional view on the line *x x* of Fig. 1.

Considering Fig. 1, my invention will be seen provided with any suitable handle A, into which the shank portion B of the blade is extended and secured. Portion B of the blade may or may not be ground to a cutting edge *b*. Its use as a culinary device for general purposes will be increased by providing my invention with a cutting edge, as described.

The principal feature of my invention is the curved portion C of the blade, which has a lower and sharpened edge *c* and an upper edge turned inwardly to form the scraper D, the inner edge *d* of which may be wedge-shaped or square, as shown. In either case the scraper is given a suitable edge or corner, enabling it to perform its special office readily. (See Fig. 2.)

The operation of my invention is almost obvious from an inspection of the drawing Fig. 1. At any part of its length an ear of corn may be partly encircled by curve C, which, being pressed forward, cuts the grains from the cob very cleanly, but any remaining edible material will manifestly be carried along by the scraper following in the path of the curved cutting edge *c*. A straight cut, where desired, may be effected by edge *b*.

I am aware that knives having curving portions of their blades are known, and I do not claim that feature solely and broadly.

Having thus sufficiently described my invention, what I claim, and desire to protect by Letters Patent of the United States, is—

1. A green-corn cutter and scraper consisting of a suitable handle and blade secured therein, said blade having a relatively straight portion ending in a curved portion, the said curved portion of the blade having one edge sharpened and the remaining edge turned perpendicularly inwardly forming a scraper, substantially as described.

2. A green-corn cutter and scraper consisting of a suitable handle and blade secured therein, said blade having a relatively straight portion having a cutting edge, said straight portion ending in a curved portion, the said curved portion of the blade having one edge sharpened and the remaining edge turned perpendicularly inwardly forming a scraper, substantially as described.

In testimony whereof I affix my signature in presence of two witnesses.

ELLEN H. WILSON.

Witnesses:
J. M. HOLLEY,
E. W. BORNSON.